(12) United States Patent
Moretti et al.

(10) Patent No.: US 6,434,962 B1
(45) Date of Patent: Aug. 20, 2002

(54) MOTOR BAFFLE

(75) Inventors: Stephen L. Moretti, Auburn; David F. Kwasigroch, Syracuse, both of NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/859,100

(22) Filed: May 16, 2001

(51) Int. Cl.$^7$ .............................................. F25D 23/12
(52) U.S. Cl. .............................. 62/262; 62/428; 310/85
(58) Field of Search ............................... 62/259.1, 262, 62/428, 429; 310/85, 89

(56) References Cited

U.S. PATENT DOCUMENTS

| | | | | |
|---|---|---|---|---|
| 3,348,082 A | * | 10/1967 | Martin | 310/85 |
| 3,727,424 A | * | 4/1973 | Edens et al. | 62/262 |
| 5,359,248 A | * | 10/1994 | Nagata et al. | 310/85 |
| 5,732,565 A | * | 3/1998 | Ramakrishnan et al. | 62/262 |
| 5,861,689 A | * | 1/1999 | Snider et al. | 310/89 |
| 6,017,375 A | * | 1/2000 | Duell et al. | 55/356 |
| 6,124,774 A | * | 9/2000 | Quelo | 310/85 |
| 6,272,878 B1 | * | 8/2001 | Chang | 62/26 |

* cited by examiner

*Primary Examiner*—William C. Doerrler
*Assistant Examiner*—Mohammad M Ali
(74) *Attorney, Agent, or Firm*—Wall Marjama & Bilinski LLP

(57) ABSTRACT

An air conditioning unit having an indoor section and an outdoor section that are separated by a dividing wall. A fan motor is mounted in a support housing within the outdoor section. The housing has a front panel containing an opening for supporting the motor so that the front section of the motor is positioned within the housing and the rear section of the motor extends outwardly from the front panel. A protective baffle is secured to the front panel that extends outwardly over the rear section of the motor. The housing and the baffle combine to shield the motor from the outside elements so that ice and snow cannot build up on the motor.

12 Claims, 4 Drawing Sheets

MOTOR BAFFLE

BACKGROUND OF THE INVENTION

This invention relates to a package terminal air conditioner (PTAC) and, more specifically, to apparatus for protecting a fan motor located in the outdoor section of the air conditioner unit from ice and snow.

In many hotels and motels, the air in the rooms or occupied areas is conditioned by a package terminal air conditioners which are sometimes referred to as PTAC units. The unit is generally contained within a rectangular shaped sleeve that passes through an outside wall of the building in which the room or occupied area is housed. The unit is separated into an indoor section and an outdoor section by a dividing wall. Each section, in turn, contains a heat exchanger and a fan for moving air over the heat exchanger surfaces. A single fan motor is employed to drive each of the fans via drive shafts that extend outwardly from either end of the motor casing. The motor is housed in the outdoor section of the unit to reduce noise and to dissipate unwanted motor induced heat to the surrounding ambient.

In winter, however, the outdoor section of the fan is exposed to snow and ice which can build up around the motor casing and thus adversely effect the operation of the unit.

SUMMARY OF THE INVENTION

It is therefore an object of the present invention to improve air conditioning units and, in particular, packaged terminal air conditioning units where the unit fan is exposed to outdoor elements.

It is a further object of the present invention to protect the fan motor located in the outdoor section of an air conditioning unit from snow and ice.

Another object of the present invention is to provide apparatus for shielding the fan motor of an air conditioning unit from ice and snow.

These and other objects of the present invention are attained in a packaged terminal air conditioning unit containing an indoor section and an outdoor section that are separated by a dividing wall. A single motor for driving the unit fans is located in the outdoor section of the unit and is therefore exposed to the outdoor elements. A motor support housing is contained in the outdoor section and is secured to the dividing wall. The housing contains a front panel having an opening formed therein for receiving the motor casing therein and securing the motor in assembly. The motor is secured to the housing panel so that the front section of the motor is contained within the housing and the rear section of the motor extends outwardly from the front panel. A protective baffle is secured to the front panel which extends outwardly over the rear section of the motor. The baffle is shaped to prevent snow or ice from building up on top of the motor.

BRIEF DESCRIPTION OF THE DRAWINGS

For a better understanding of these and other objects of the present invention, reference will be made to the following detailed description of the invention which is to be read in association with the accompanying drawings, wherein.

DETAILED DESCRIPTION OF THE INVENTION

Figure 1:
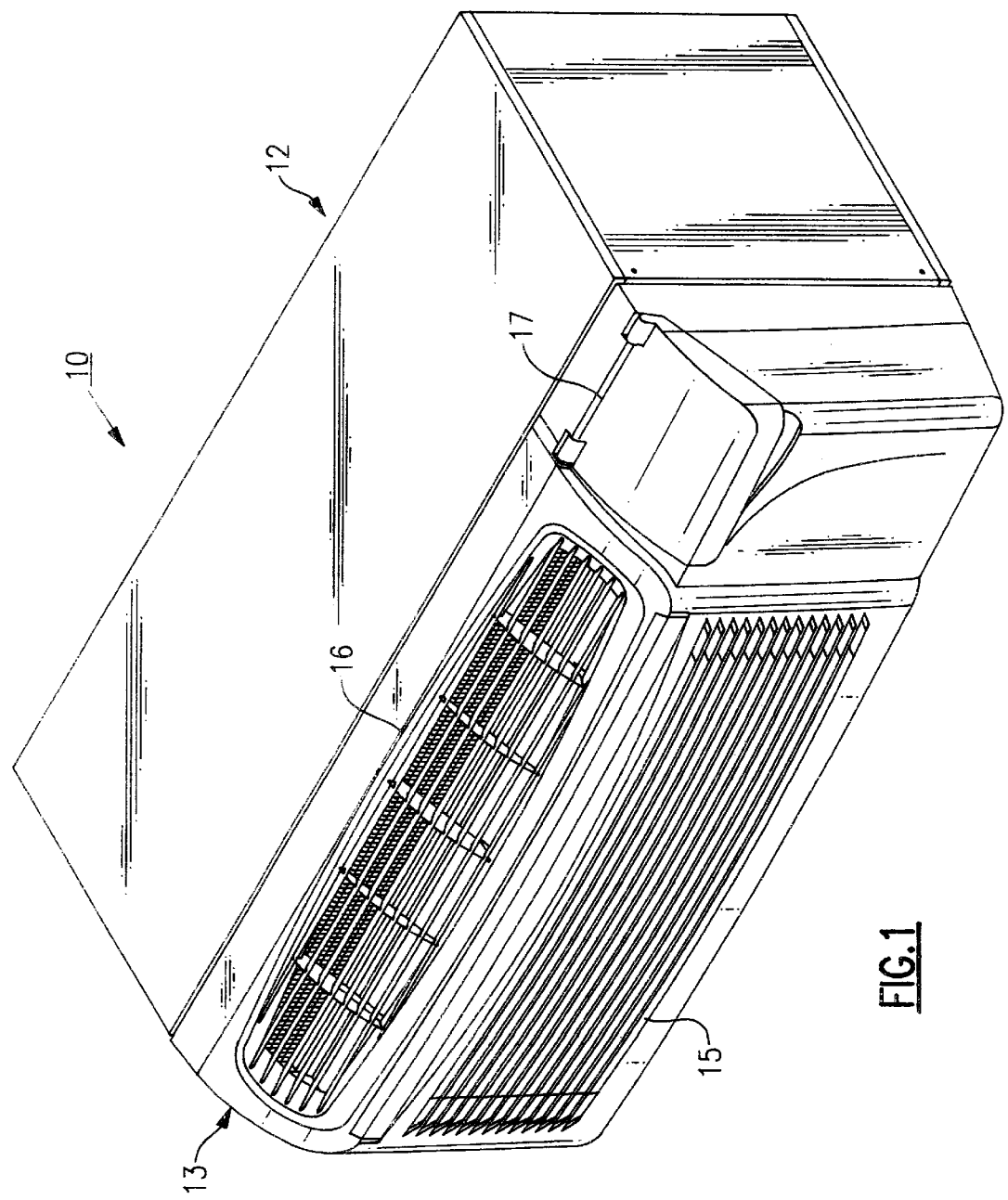
FIG. 1 is a front perspective view of an air conditioning unit embodying the teachings of the present invention.

Turning initially to FIG. 1, there is illustrated a packaged terminal air conditioner (PTAC) unit, generally referenced 10, that embodies the teachings of the present invention. The unit is housed within a sleeve 12 that is contained within an outdoor wall of a room or comfort area that is being serviced by the unit. The front part of the unit is closed by a front cover 13 that fits tightly against the sleeve in assembly. The cover contains an air inlet opening 15 through which indoor air is drawn into the unit and an outlet opening 16 through which conditioned air is returned to the comfort region. Although not shown, the unit controls are located in a recessed well behind the front cover and access to the controls is afforded through a door 17 that is hinged to the cover.

As noted above, the sleeve 12 is typically fabricated to standard dimensions so that different units provided by various manufacturers can be interchangeably mounted within the sleeve. Accordingly, the amount of space afforded the air conditioning unit is generally limited which, in turn, limits the amount of space available to mount the fan motor unit.

Figure 2:
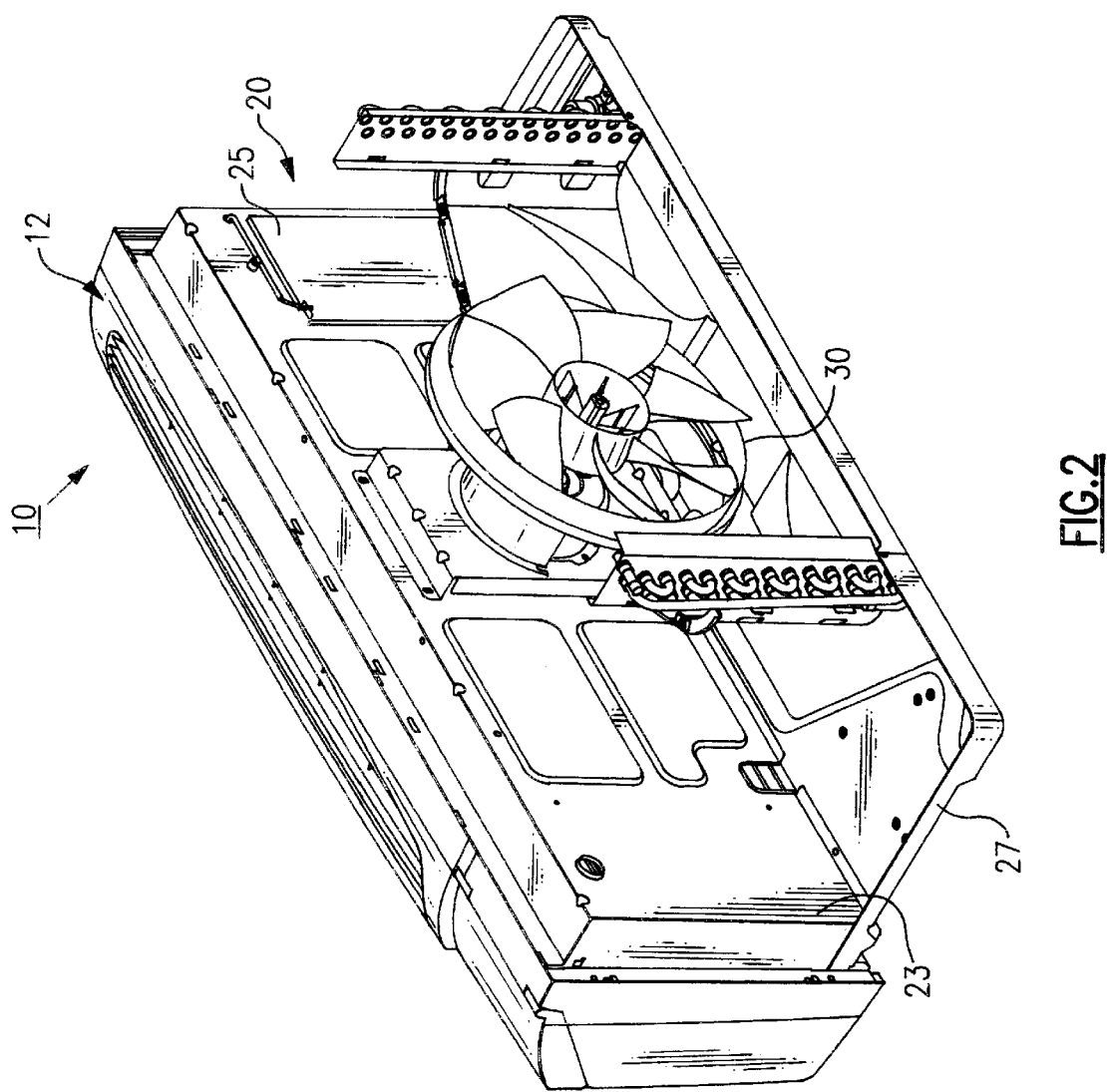
FIG. 2 is a rear perspective view of the air conditioner illustrated in FIG. 1 with parts broken away to show the outdoor fan and fan motor assembly.
Figure 3:
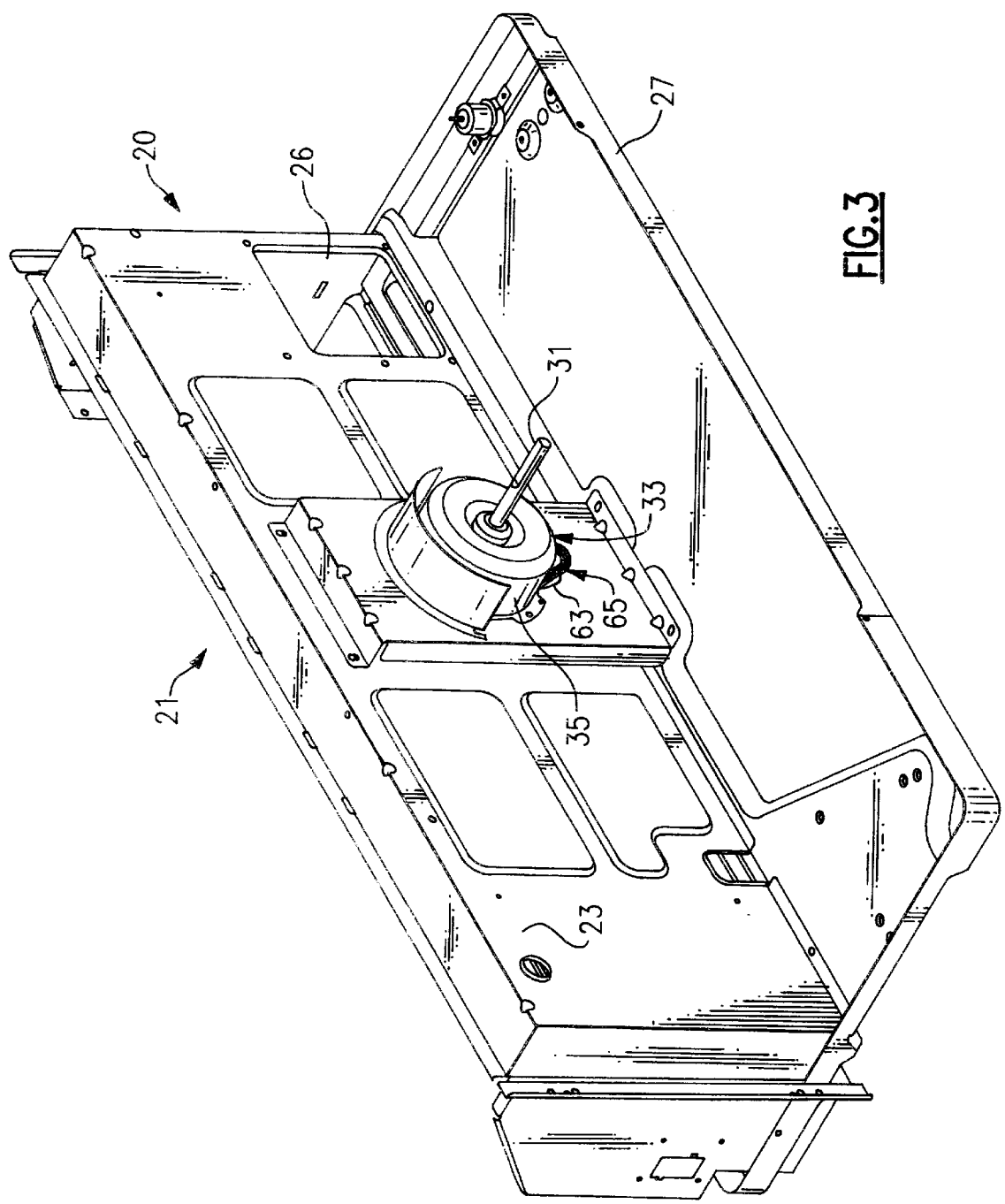
FIG. 3 is a rear perspective view of the air conditioning unit with the outdoor fan removed to better show the apparatus for shielding the motor from the elements.
Figure 4:
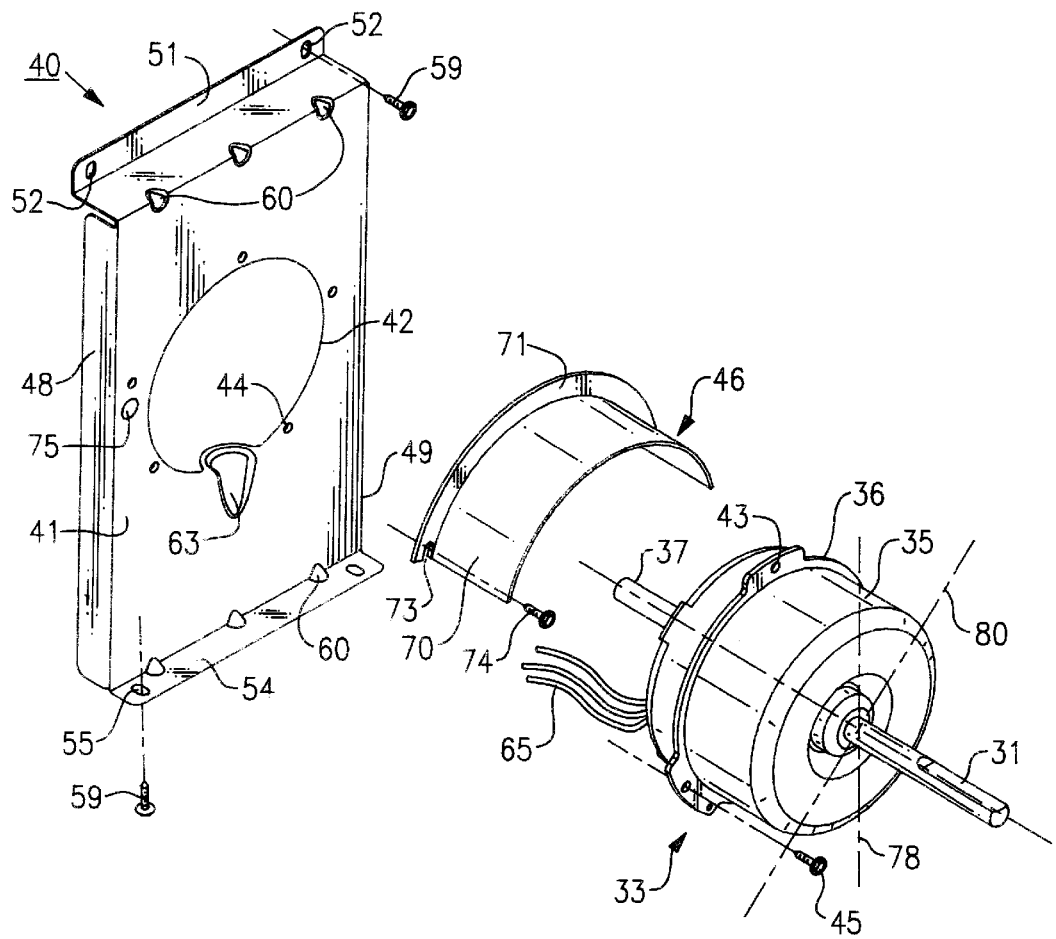
FIG. 4 is an enlarged exploded view in perspective showing the motor and the apparatus for shielding the motor from the elements.

With further reference to FIGS. 2–4, the rear outdoor section 20 of the unit is illustrated in greater detail. The outdoor section of the unit is separated from the indoor section 21 (FIG. 3) by a dividing wall 23 that closes tightly against he interior of the sleeve so that outdoor air cannot enter the indoor section under uncontrolled conditions. A door 25 is provided in the divider wall which can be adjustably opened to allow a given amount of outside air to pass through the door opening 26 and be mixed with indoor air under controlled conditions.

The dividing wall 23 is seated upon and secured to the base pan 27 of the unit. The outdoor fan 30 of the unit is mounted upon shaft 31 of a fan motor 33. The motor includes a cylindrical casing 35 and an annular bolting flange 36 that surrounds the casing. A second front shaft 37 protrudes forward of the motor casing and is arranged to pass through the dividing wall into the indoor section of the air conditioning unit. Although not shown, the indoor fan of the unit is secured to the front shaft and is arranged to pass comfort air over the indoor heat exchanger.

In assembly, the motor is supported in a shallow housing generally referenced 40 (FIG. 4). Preferably, the housing is fabricated from a single piece of sheet metal, however, it can be molded from a suitable plastic material without departing from the teachings of the present invention. The housing includes a rectangular front panel 41 that contains a circular opening 42 for slidably receiving the front end of the motor casing therein. The bolting flange of the motor is brought into contact with the front face of the panel and holes 43 in the flange are placed in alignment with receiving holes 44 that surround the opening 42. Threaded fasteners, such as self taping screws 45, are passed through the aligned mounting holes to securely fasten the flange to the front panel of the housing. A shield 46 is placed over the motor casing and is similarly secured to the front face of the front panel also using fasteners 45 that are threaded into receiving holes in the front panel.

A pair of opposed side walls 48 and 49 are cojoined to the side edges of the front panel of the housing. The side walls extend along the height of the panel and are perpendicularly aligned with the panel and extend back in a rearward direction. A top wall 50 is also cojoined with the top edge of the front panel and extends across the width of the panel. The top wall is also perpendicularly aligned with the front panel and extends rearward from the panel. A vertically disposed mounting strip 51 extends upwardly along the back edge of the top wall and contains a series of holes 52–52 through which threaded fasteners such as self tapping screws 53 can be passed. A horizontally disposed outwardly extended mounting strip 54 passes along the bottom edge of the front panel and also contains a series of holes 55–55 through which threaded fasteners 59 can be passed.

In assembly, the back of the vertically disposed mounting strip 51 is placed against the back of the dividing wall and the horizontally disposed mounting strip 54 is similarly placed against the top of the unit base pan 27. The mounting strips are secured in place also using self taping screws as described above that are passed through the receiving holes in the strips and threaded into the dividing wall and the base pan to secure the housing to the unit.

Reinforcing gussets 60 are located between the horizontal mounting strip and the front panel as well as between the top wall and the front panel. The gussets are formed by stamping depressions in the metal using well known stamping techniques. The gussets provide additional strength to the mount so that the mount can readily withstand motor induced stresses and prevent the motor and thus the unit fans from vibrating under load. A cusp 63 is also formed in the front panel along the motor receiving opening by again deforming the panel as illustrated in FIG. 4. The cusp is large enough to allow electrical lines 65 (FIG. 3) to pass therethrough.

The baffle 46 contains a semi circular body 70 having an end flange 71 integrally joined the body section. The baffle again can be stamped from sheet metal or molded from a suitable plastic material to the desired shape. The end flange contains slotted holes 73 at either end for receiving threaded fasteners such as self tapping screws 74 therein which, as described above, are threaded into holes 75 in the front panel 41 of the housing 40. Although threaded fasteners are employed in this embodiment of the invention, it should be evident that the baffle can be secured to the front panel of the housing using spot welds or the like.

The body of the baffle complements the shape of the motor casing which, in this case, is circular. The baffle is centered on the vertical axis 78 of the motor and subtends an arc of at least 90? to either side of the vertical axis so that the opposite ends of the body are at least coextensive with the horizontal axis 80 of the motor or preferably extend slightly below the horizontal axis. The axial length of the body section of the baffle is also slightly greater than the axial length of the rear section of the motor casing that extends outwardly from the front panel of the housing. The radius of curvature of the body section is centered on the center of the motor casing and is greater than the radius of the casing. Accordingly, the rear section of the motor is well shielded from any snow or ice that might enter the outdoor section of the air conditioning unit.

Although snow and ice may build up on the motor baffle, the snow and ice will melt when the unit is placed in operation. Because of the configuration of the baffle, the moisture from the melt will be directed to either side of the motor and drops into the base pan of the unit. The base pan, in turn, is contoured so that the moisture is directed away from the motor and eventually is moved out of the unit using method and apparatus that is known in the art.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. In an air conditioning unit having an indoor section and an outdoor section that are separated by a dividing wall and a fan motor located in the outdoor section of the unit, apparatus for protecting said fan motor from the elements that includes:

a motor support housing located in the outdoor section of the unit that is joined to the dividing wall,
said support housing having a front panel containing an opening therein for receiving the motor so that a front section of the motor is positioned within said housing and a rear section of the motor extends outwardly from said front panel, and
a protective baffle secured to the front panel of the housing that extends outwardly over the rear section of the motor for preventing snow and moisture from building up on the motor.

2. The apparatus of claim 1 that further includes means for securing the motor to said housing.

3. The apparatus of claim 1 wherein said baffle contains a body section that compliments the shape of the motor and extends axially along the length of said rear section of the motor.

4. The apparatus of claim 3 wherein said baffle includes a mounting flange at one end of said body section and means for securing the flange to the front panel of the housing.

5. The apparatus of claim 3 wherein said housing and said baffle are fabricated from sheet metal.

6. The apparatus of claim 3 wherein said housing and said baffle are molded of plastic.

7. The apparatus of claim 3 wherein said motor includes a cylindrical casing and the body section of the baffle is semi circular in form and is centered upon the vertical axis of the motor.

8. The apparatus of claim 7 wherein the radius of curvature of the body section is centered upon the longitudinal axis of the motor.

9. In an air conditioning unit having an indoor section and an outdoor section that are separated by a dividing wall and a cylindrical fan motor located in the outdoor section of the unit, apparatus for protecting the said fan motor form the elements that includes:

a vertically disposed panel mounted in the outdoor section of the unit parallel to the dividing wall, said panel having an opening therein for receiving the motor therein so that the front section of the motor is positioned between the panel and the dividing wall and the rear section extends outwardly from the panel;
means for securing the motor to the panel so that the central axis of the motor is perpendicular to the panel;
a baffle secured to the panel that extends outwardly from the panel over said motor whereby snow and ice is prevented from building up upon said motor.

10. The apparatus of claim 9 wherein said baffle includes a semi-circular body section and an integral mounting flange at one end of said body section and means for affixing the flange to the panel so that the body section is centered upon the vertical axis of said motor.

11. The apparatus of claim 10 wherein said mounting flange contains receiving holes formed therein and the means for affixing the flange to the panel are screws that pass through the receiving hoels and are threaded into said panel.

12. The apparatus of claim 9 wherein said panel has opposed side walls and a top wall that extends between the panel and the dividing wall.

* * * * *